US012197888B2

(12) United States Patent
Langhammer

(10) Patent No.: US 12,197,888 B2
(45) Date of Patent: Jan. 14, 2025

(54) RANK-BASED DOT PRODUCT CIRCUITRY

(71) Applicant: Intel Corporation, Santa Clara, CA (US)

(72) Inventor: Martin Langhammer, Alderbury (GB)

(73) Assignee: Altera Corporation, San Jose, CA (US)

(*) Notice: Subject to any disclaimer, the term of this patent is extended or adjusted under 35 U.S.C. 154(b) by 1114 days.

(21) Appl. No.: 16/724,784

(22) Filed: Dec. 23, 2019

(65) Prior Publication Data

US 2020/0125329 A1     Apr. 23, 2020

(51) Int. Cl.
*G06F 7/523*     (2006.01)

(52) U.S. Cl.
CPC .................................. *G06F 7/523* (2013.01)

(58) Field of Classification Search
CPC . G06F 7/5443; G06F 7/523; G06F 7/52–5338
See application file for complete search history.

(56) References Cited

U.S. PATENT DOCUMENTS

| | | | |
|---|---|---|---|
| 4,727,354 A | 2/1988 | Lindsay | |
| 6,282,556 B1 | 8/2001 | Chehrazi et al. | |
| 6,353,843 B1 | 3/2002 | Chehrazi et al. | |
| 6,456,608 B1 | 9/2002 | Lomp | |
| 8,458,243 B1* | 6/2013 | Demirsoy | G06F 7/5443 708/522 |
| 8,683,183 B2 | 3/2014 | Sprangle | |
| 9,104,474 B2 | 8/2015 | Kaul et al. | |
| 9,110,655 B2 | 8/2015 | Sprangle | |
| 9,684,488 B2 | 6/2017 | Langhammer | |
| 2002/0194239 A1 | 12/2002 | Pangal | |
| 2004/0225703 A1 | 11/2004 | Pangal | |
| 2013/0304787 A1* | 11/2013 | Le-Gall | G06F 7/525 708/625 |
| 2020/0073637 A1* | 3/2020 | Carlson | G06F 7/5443 |
| 2020/0371749 A1* | 11/2020 | Kennedy | G06F 7/5272 |
| 2021/0073171 A1* | 3/2021 | Master | G06F 7/5443 |

OTHER PUBLICATIONS

Extended European Search Report for EP 20193143.3 mailed Feb. 16, 2021.

(Continued)

*Primary Examiner* — Michael D. Yaary
(74) *Attorney, Agent, or Firm* — Fletcher Yoder, P.C.

(57) ABSTRACT

Integrated circuits with dot product circuitry are provided. The dot product circuitry may be configured to generate partial products of different ranks based on the inputs. The partial products may be organized into corresponding groups based on their ranks. Each group of partial products having the same rank can then be compressed using a compressor/reduction tree. At least some of the compressed partial product values may be shifted between the different groups to maintain the proper offset. Each partial product may have an associated one's to two's complement conversion bit. The conversion bits of the various partial product groups can be separately aggregated and then injected into the compressor tree at one or more locations.

20 Claims, 13 Drawing Sheets

(56) References Cited

OTHER PUBLICATIONS

Maltabashi et al., "Physically Aware Affinity-Driven Multiplier Implementation," IEEE Transactions on Computer-Aided Design of Integrated Circuits and Systems, vol. 39, No. 10, Oct. 2020, p. 2886-2897.
Hussin et al., "An efficient Modified Booth multiplier architecture," 2008 International Conference on Electronic Design, Dec. 1, 2008, pp. 1-4.
Liang et al., "An Innovative Booth Algorithm," 2016 IEEE Advanced Information Management, Communicates, Electronic and Automation Control Conference (IMCEC), IEEE, Oct. 3, 2016, pp. 1711-1715.
Extended European Search Report for EP 20193143.3 mailed Apr. 13, 2023.
Smith S P et al: "A Fast Inner Product Processor Based on Equal Alignments", Journal of Parallel and Distributed Computing, Elsevier, Amsterdam, NL, vol. 2, No. 4, Nov. 1, 1985 (Nov. 1, 1985), pp. 376-390, XP000084818, ISSN: 0743-7315, DOI: 10.1016/0743-7315(85)90021-8.

\* cited by examiner

RANK-BASED DOT PRODUCT CIRCUITRY

BACKGROUND

This invention relates generally to integrated circuits and, in particular, to integrated circuits operable to support dot product arithmetic.

Recent developments in artificial intelligence such as advancements in machine learning and deep learning involve training and inference, which have necessitated a much higher density of dot product computations with multiple precisions. Conventional dot product circuitry includes different multiplier groups, each of which is configured to compute a different product. For example, a 4-element dot product circuit for computing the dot product of a first vector [a3, a2, a1, a0] and a second vector [b3, b2, b1, b0] will include a first multiplier group for computing a0*b0, a second multiplier group for computing a1*b1, a third multiplier group for computing a2*b2, and a fourth multiplier group for computing a3*b3. Forming dot product circuits using this conventional structure may require a significant amount of circuit area, which is exacerbated as the precision of each element $a_i$ or $b_i$ increases beyond 4 bits, beyond 8 bits, or beyond 10 bits.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

DETAILED DESCRIPTION

The present embodiments relate to dot product circuitry that group multiplier partial products according to their rank instead of the multiplier with which they are associated. Moreover, the ones and twos complement bits for sign extension may also be grouped by rank and processed on a rank basis prior to combining with the sum of the partial products. Dot product circuitry configured and operated in this way are at least 20% smaller in size at any given speed while consuming less power.

It will be recognized by one skilled in the art, that the present exemplary embodiments may be practiced without some or all of these specific details. In other instances, well-known operations have not been described in detail in order not to unnecessarily obscure the present embodiments.

Figure 1:
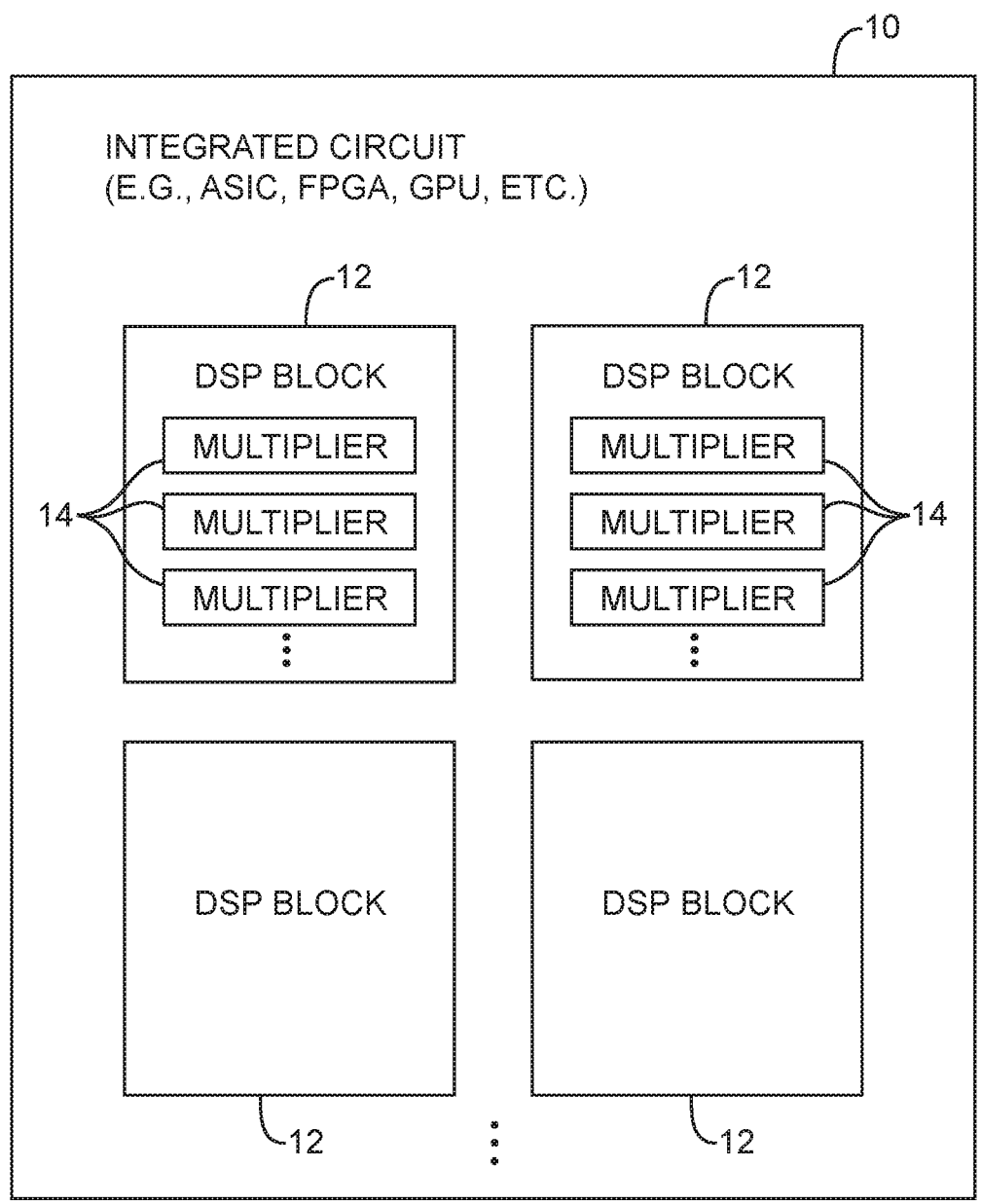
FIG. 1 is a diagram of an illustrative integrated circuit that includes digital signal processing (DSP) blocks in accordance with an embodiment.

FIG. 1 is a diagram of an illustrative integrated circuit 10 that includes digital signal processing (DSP) blocks in accordance with an embodiment. Integrated circuit device 10 may, for example, be a central processing unit (CPU), a programmable integrated circuit, a graphics processing unit (GPU), an application-specific integrated circuit (ASIC), an application specific standard product (ASSP), a microcontroller, a microprocessor, etc. Examples of programmable integrated circuits include programmable logic devices (PLDs), field programmable gate arrays (FPGAs), programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), and complex programmable logic devices (CPLDs), just to name a few.

As shown in FIG. 1, device 10 may include multiple specialized processing blocks such as digital signal processing (DSP) blocks 12. In general, a DSP block 12 may be an embedded hard functional block designed to support a variety of high-performance, high/variable-precision signal processing functions such as finite impulse response (FIR) filtering, fast Fourier transforms (FFT), digital up/down conversion, high-definition (HD) video processing, etc. Each DSP block 12 may include multiple multiplier circuits 14. If desired, two or more multiplier circuits 14 may be combined together to form a larger multiplier circuit. Although DSP blocks 12 of FIG. 1 are only shown to include multiplier circuits 14, DSP blocks 12 generally include circuitry capable of supporting addition, subtraction, accumulation, and other arithmetic functions.

Figure 2:
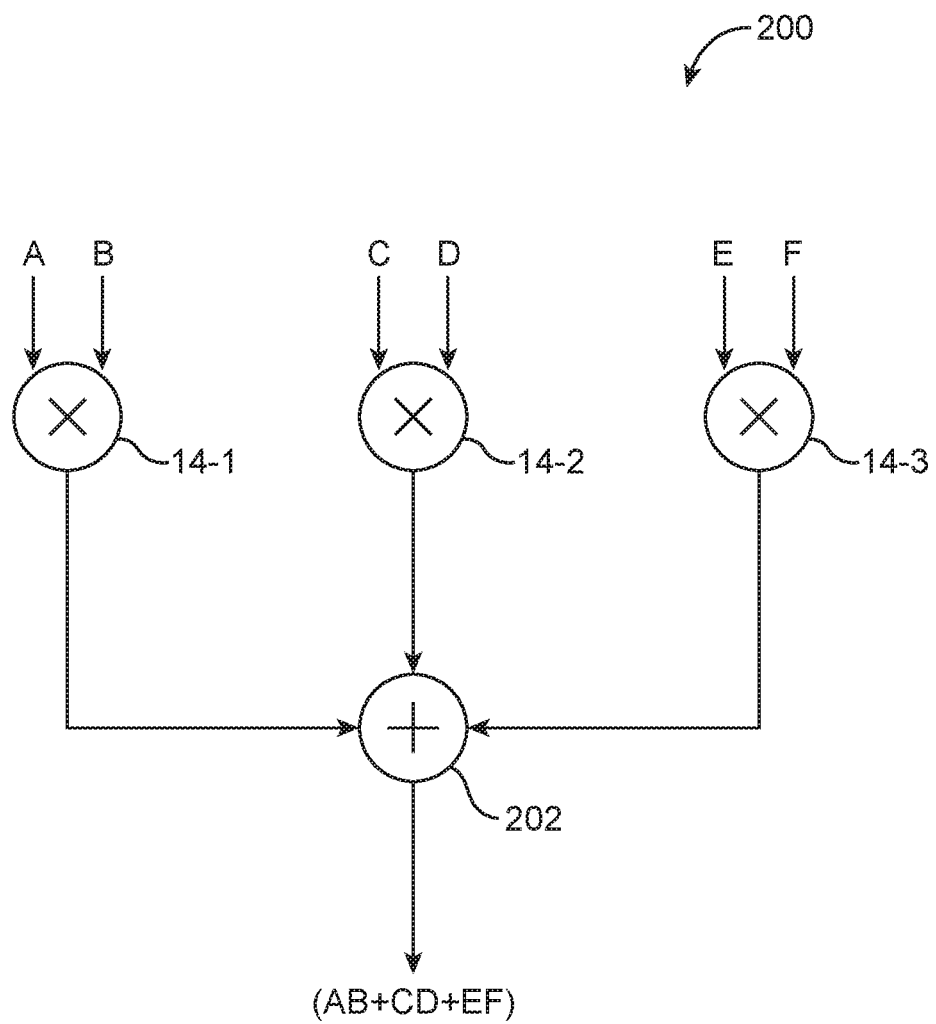
FIG. 2 is a diagram of an illustrative 3-element dot product circuit.

FIG. 2 is a diagram of a 3-element dot product circuit 200. As shown in FIG. 2, dot product circuit 200 includes a first multiplier 14-1 for computing the product of inputs A and B, a second multiplier 14-2 for computing the product of inputs C and D, and a third multiplier 14-3 for computing the products of inputs E and F. Dot product circuit 200 further includes a separate adder 202 for summing together the three products generated by multipliers 14-1, 14-2, and 14-3 to generate a final dot product output that is equal to (A*B+ C*D+E*F). In the example of FIG. 2, the multiplications performed by multipliers 14-1, 14-2, and 14-3 occur in parallel and are then summed at adder 202. New input data can be received every clock cycle, and new output data can be generated every clock cycle after some fixed latency. In practice, however, dot product circuits are not actually built using monolithic multipliers 14 and adder 202 in this way.

In practice, most ASIC multipliers are implemented using radix-4 Booth coding. In contrast to typical grade-school binary (i.e., radix-2) multiplication where the multiplicand is multiplied with each bit in the multiplier to generate a corresponding number of partial products that is equal to the total number of bits in the multiplier, radix-4 Booth boding generates one partial product for every two multiplier bits.

Figure 3:
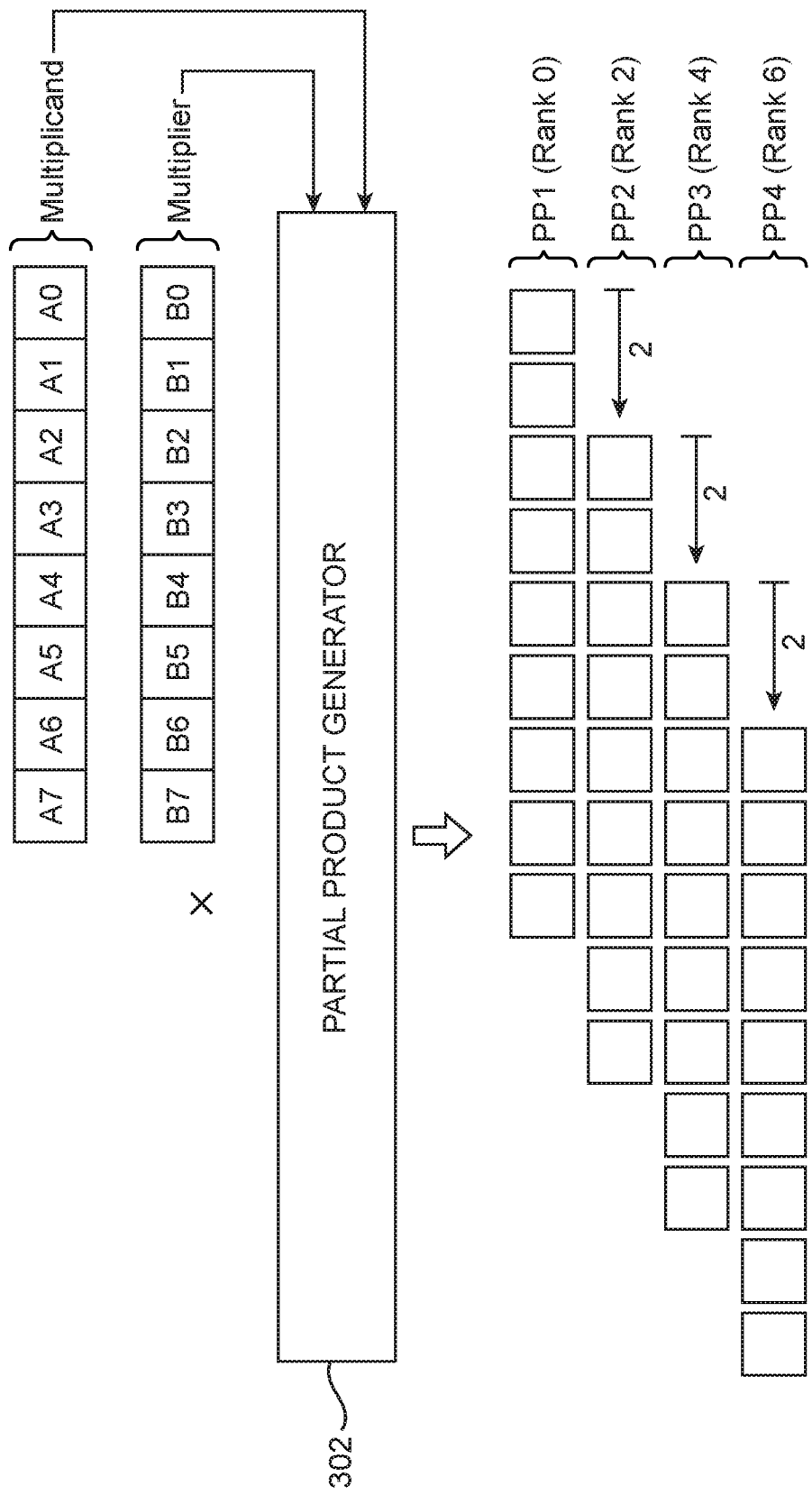
FIG. 3 is a diagram illustrating multiplier products generated using a radix-4 Booth's encoding in accordance with an embodiment.

FIG. 3 is a diagram illustrating multiplier products generated using the radix-4 Booth encoding in accordance with an embodiment. As shown in FIG. 1, an 8-bit multiplicand [A7:A0] is multiplied with an 8-bit multiplier [B7:B0]. With radix-4 Booth coding, a first partial product PP1 is generated which is the result of [A7:A0]*[B0,B1]; a second partial product PP2 is generated which is the result of [A7:A0]* [B3,B2]; a third partial product PP3 is generated which is the result of [A7:A0]*[B5,B4]; and a fourth partial product PP4 is generated which is the result of [A7:A0]*[B7,B6]. Assuming the multiplier is a signed 8-bit integer, each partial product will either be two times the multiplicand, one times the multiplicand, zero times the multiplicand, negative one times the multiplicand, or negative two times the multiplicand (e.g., each partial product can be one of {2,1,0,−1,−2} times the multiplicand). Since it is possible to multiply the multiplicand by a factor of ±2, each partial product will be 9-bits long (i.e., one bit wider than the original 8-bit multiplicand to account for possible overflow). The partial products may be generated using a partial product generation circuit such as radix-4 partial product generator 302 configured to receive the input operands.

FIG. 3 illustrates the relative weight of each partial product. In the radix-4 Booth coding implementation, the second partial product PP2 is shifted by 2 bits to the left relative to the first partial product PP1, the third partial product PP3 is shifted by 4 bits to the left relative to PP1, and the fourth partial product PP4 is shifted by 6 bits to the left relative to PP1. The unshifted PP1 is sometimes referred to as having a rank or weight of 0 (i.e., rank 0). The 2-bit shifted PP2 is sometimes referred to as having a rank or weight of 2 (i.e., rank 2). The 4-bit shifted PP3 is sometimes referred to as having a rank or weight of 4 (i.e., rank 4). The 6-bit shifted PP4 is sometimes referred to as having a rank or weight of 6 (i.e., rank 6). The term "rank" therefore describes the relative shifting between the different partial products. In general, the total number of partial products for any radix-4 Booth coding implementation will be equal to the bit-width of the multiplicand divided by two, since each partial product is generated from two bit sections of the multiplier. In this example, the total number of partial products is equal to 4 (i.e., 8 divided by 2). Partial products generated in this way can be subsequently combined using a compressor tree (see, e.g., FIG. 4).

Figure 4:
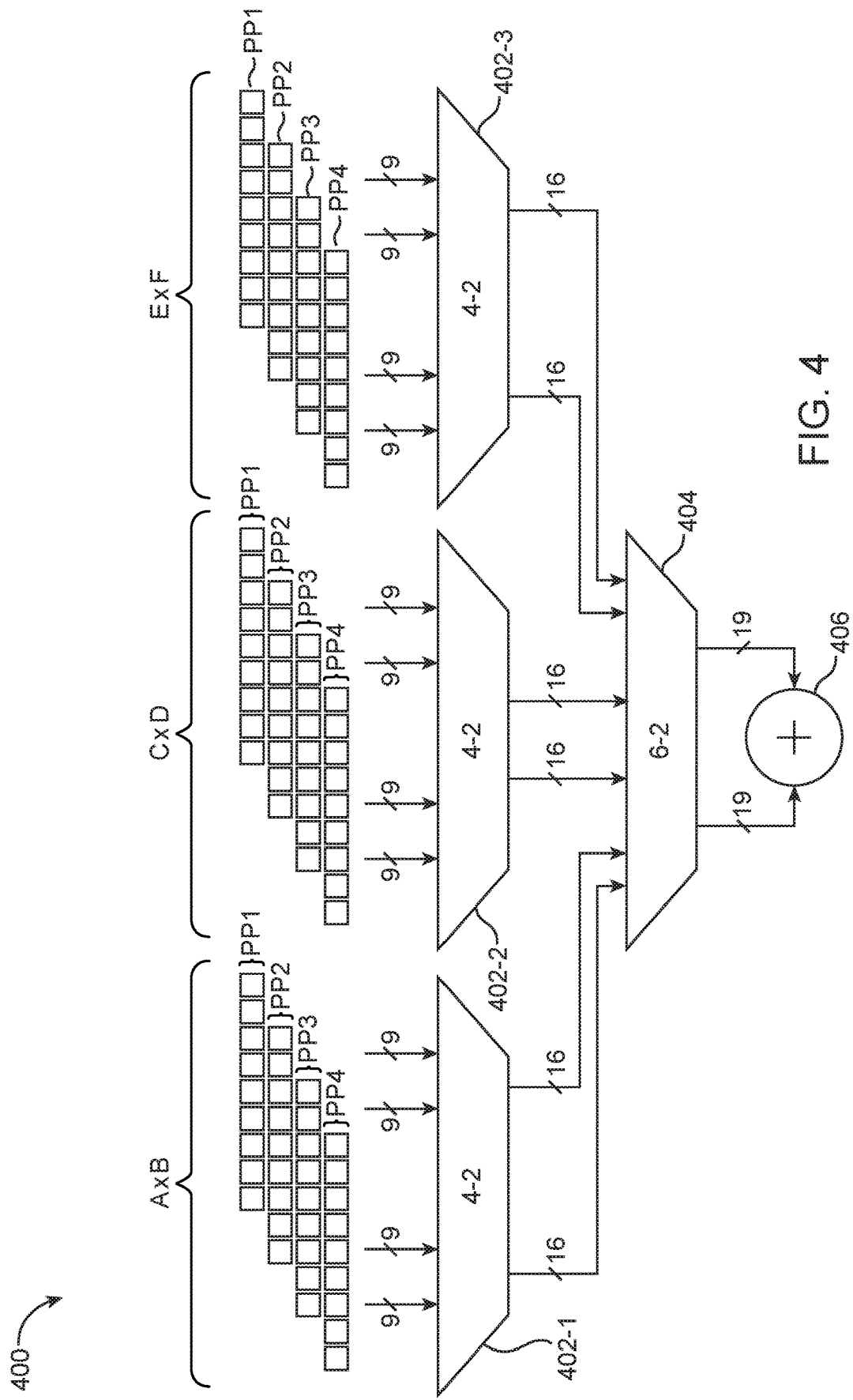
FIG. 4 is a diagram showing one implementation of a 3-element dot product circuit that is susceptible to substantial word growth in compressor outputs.

FIG. 4 is a diagram showing one implementation of a 3-element dot product circuit 400 configured to compute three multiplies (e.g., A*B, C*D, and E*F). Here, each input operand A, B, C, D, E, and F are 8-bit integers (as an example). Thus, as described above in connection with FIG. 3, each product of two 8-bit integers using radix-4 Booth coding may generate four corresponding 9-bit partial products.

Each set of four partial products associated with a multiplier may be combined or compressed using a respective compressor circuit 402. Since there are four partial products in each multiplier group, each compressor circuit 402 has four inputs each of which is configured to receive one of the four 9-bit partial products in each group and to generate a first sum/carry vector at a first output and a second sum/carry vector at a second output. In the example of FIG. 4, a first 4-2 compressor 402-1 is configured to compress the four partial products associated with inputs A and B; a second 4-2 compressor 402-2 is configured to compress the four partial products associated with inputs C and D; and third 4-2 compressor 402-3 is configured to compress the four partial products associated with inputs E and F. The output vectors from the three compressors 402-1, 402-2, and 402-3 may be further compressed using 6-2 compressor 404 until only two sum/carry vectors remain. This point, the two resulting sum/carry vectors may be summed together using adder circuit 406 to generate the final dot product value.

In this example, note that the word width of the output vectors is much higher than the width of each input vector. For instance, each output of 4-2 compressor 402 may be 16 bits, which is much wider than the 9-bit partial products. This increase in bit width from input to output (sometimes referred to as "compressor word growth") is due to the fact that the various partial products are offset/shifted with respect to one another. As shown in FIG. 4, the fourth partial product PP4 is shifted six bits to the left, which necessarily extends the output vector by at least six bits. Thus, each group of four 9-bit partial products will generate with 16-bit output vectors. The compressors in this dot product architecture are therefore susceptible to substantial word growth.

This word growth in multiplier redundant outputs of the compressors has a significant impact on the size of the overall dot product circuit 400. As the precision of inputs increases beyond 8 bits, which could increase the total number of partial products and would potentially exacerbate the word growth, and as number of multiplies increases beyond three, which would directly increase the total number of compressors if using the dot product architecture of FIG. 4, the overall size of the dot product circuit may consume too much circuit area.

There is another consideration when building dot product circuits in this way. Since the inputs are signed numbers, the corresponding partial products may also need to be sign extended. In accordance with an embodiment, a negative number may be represented using two's complement, which requires first inverting all the bits to generate the one's complement and then converting to the two's complement by adding a "1" at the least significant bit (LSB) position. Thus, there needs to be a way to add a "1" to the LSB of each negative partial product after the multiplicand has first been inverted.

Figure 5:
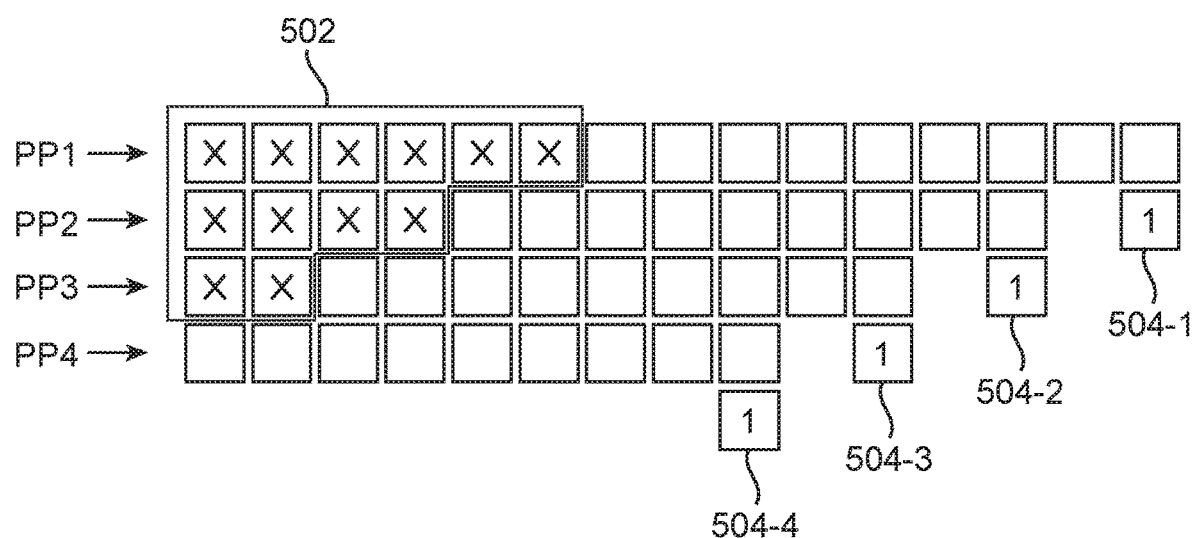
FIG. 5 is a diagram illustrating additional circuitry that is needed for implementing sign extension and one's complement to two's complement conversion in accordance with an embodiment.

This is illustrated in FIG. 5, where the "X's" in region 502 illustrates the requisite sign extension and where the extras "1's" in blocks 504 have to be added to the LSB of each partial product. As shown in FIG. 5, the sign extension may effectively add 25% or more circuit area to the partial product matrix, which is a substantial overhead. The pedantic sign extension scheme shown in FIG. 5 is merely illustrative and is not intended to limit the scope of the present embodiments. If desired, other more efficient sign extension methods may be implemented. The method of sign extension does not affect the addition or aggregation of the "1"s, which is discussed next.

As illustrated by blocks 504, the "1"s need to be added in case a partial product is negative. Most of these ones are relatively inexpensive but may still require decoding. For instance, the "1" associated with a negative first partial product PP1 can be hidden with the second partial product PP2, as illustrated by block 504-1. Similarly, the "1" associated with a negative PP2 can be hidden with the third partial product PP3, as illustrated by block 504-2. Moreover, the "1" associated with a negative PP3 can also be hidden with the fourth partial product PP4, as illustrated by block 504-3. However, the "1" associated with a negative PP4 is problematic and cannot be hidden like the others, as illustrated by block 504-4, so a separate compression function is required to account for this extra bit.

Figure 6:
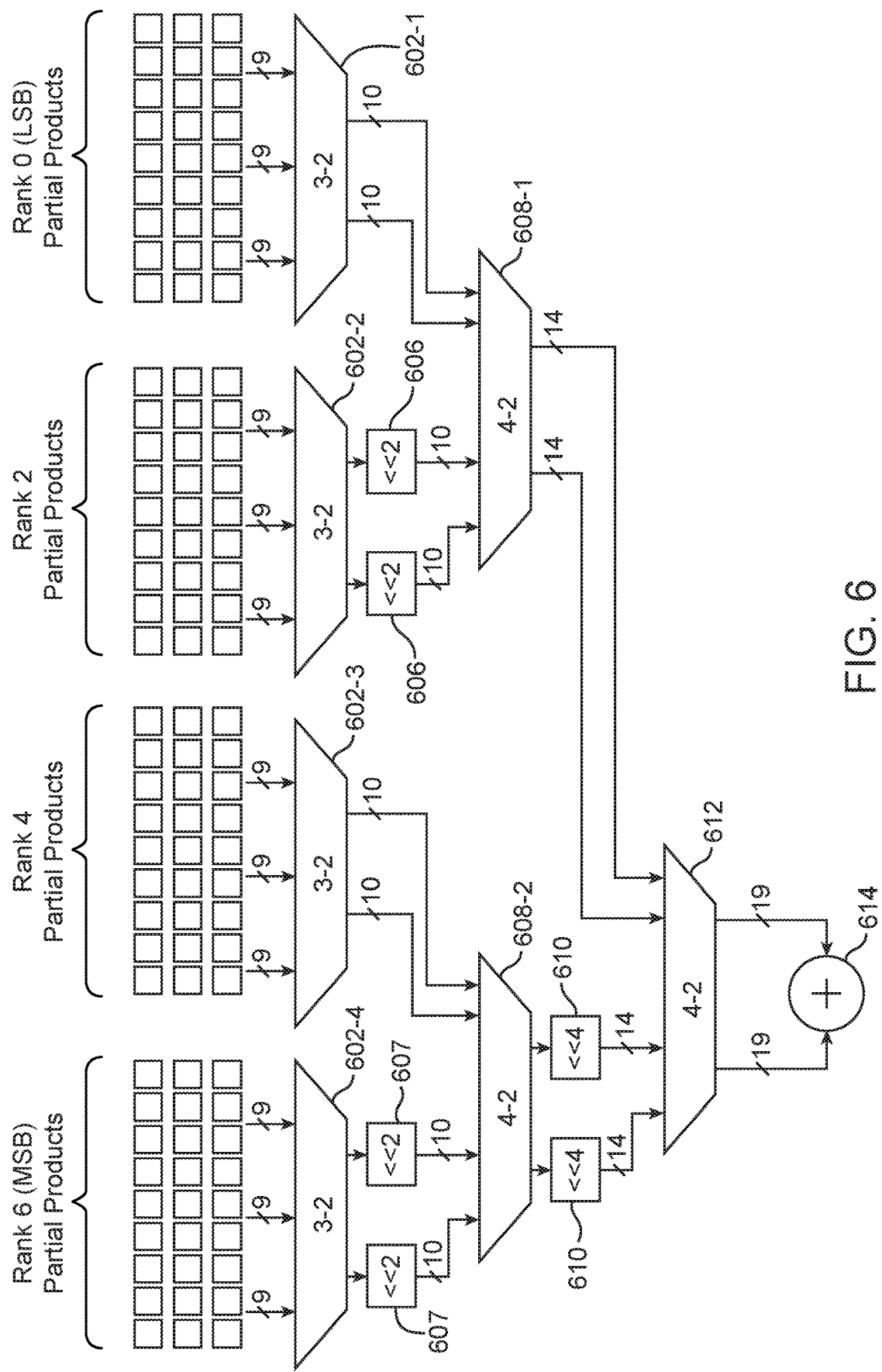
FIG. 6 is a diagram of illustrative rank-based dot product circuitry in accordance with an embodiment.

In accordance with an embodiment, FIG. 6 is a diagram of illustrative dot product circuitry 600 configured to reorganize the partial products having the same rank into respective groups prior to compression. The example of FIG. 6 also illustrates three multiplies of 8-bit integers (INT8), but the partial products are grouped according to their rank number. In the example of FIG. 4, the dot product architecture was organized into three groups, each of which has four partial products. In the example of FIG. 6, the dot product architecture has been reorganized into four groups based on their rank, each of which has three partial products.

As shown in FIG. 6, the three "rank 0" partial products may be compressed using a first 3-2 compressor 602-1; the three "rank 2" partial products may be compressed using a second 3-2 compressor 602-2; the three "rank 4" partial products may be compressed using a third 3-2 compressor 602-3; and the three "rank 6" partial products may be compressed using a fourth 3-2 compressor 602-4. No shifting is required between the partial products of each group prior to compression since they are all of the same rank. This lack of need for shifting prior to compression reduces or minimizes compressor word growth, which can help dramatically reduce circuit area while saving power. Thus, instead of growing to 16 bits at the outputs of compressors 402 as shown in the example of FIG. 4, compressors 602 in FIG. 6 has a much reduced output bit width of only 10 bits (i.e., only a 1-bit word growth). Dot product circuitry 600 arranged in this way is sometimes referred to as "rank-based" dot product circuitry.

Instead of shifting the partial products before the compression, dot product circuitry 600 may be configured to shift the compressed vectors of each rank. In FIG. 6, the compressed vectors output from rank 0 compressor 602-1 is unshifted, whereas the compressed vectors output from rank 2 compressor 602-2 are shifted two bits to the left using (<<2) shifting circuits 606. The unshifted rank 0 vectors output from compressor 602-1 should be sign extended by 2 bits prior to combining with the shifted rank 2 vectors. These four vectors associated with the right two partial product groups may then be combined using a first 4-2 compressor 608-1. The compressed vectors output from rank 4 compressor 602-3 is unshifted, whereas the compressed vectors output from rank 6 compressor 602-4 are shifted two bits to the left using (<<2) shifting circuits 607. The unshifted rank 4 vectors output from compressor 602-3 should be sign extended by 2 bits prior to combining with the shifted rank 6 vectors. These four vectors associated with the left two partial product groups may then be combined using a second 4-2 compressor 608-2.

The compressed vectors output from compressor 608-2 may be further shifted by four bits to the left using (<<4) shifting circuits 610 relative to the compressed vectors output from compressor 608-1 since the left two groups are offset by four rank positions relative to the right two groups. The two output vectors from compressor 608-1 and the two (<<4) shifted output vectors from compressor 608-2 may then be compressed using a 4-2 compressor 612 until only two sum/carry vectors remain. This point, the two resulting sum/carry vectors may be summed together using adder circuit 614 to generate the final dot product value. For example, adder circuit 614 may be implemented as a carry propagate adder (CPA) or other suitable adder circuit.

Although only 3-2 and 4-2 compressors are shown in FIG. 6, dot product circuitry 600 may be implemented using other compression ratios, compressor tree, compressor pattern, or compressor architectures depending on the number of total number of partial product groups and the bit width of each partial product. The compressor architecture used in the dot product circuitry may sometimes be referred to as the multiplier "reduction" scheme. Configured in this way where the partial products are grouped according to their rank, the number of partial products or the "column height" of each group will be equal to the number of multiplies (i.e., the total number of dot product elements). Thus, the number of groups (or "columns") will be equal to the total number of ranks, which is equal to the input bit width divided by two (assuming radix-4 Booth coding) as described above in connection with FIG. 3.

Thus, in the example of FIG. 6 that illustrates a 3-element dot product of INT8 numbers, there are four groups (8 divided by 2) of three partial products in each group (i.e., 3 multiplies for a 3-element dot product). In another suitable arrangement, dot product circuitry of the type shown in FIG. 6 that is configured to support a 4-element dot product of INT8 operands should have four groups (8 divided by 2) of four partial products in each group (i.e., 4 multiplies for a 4-element dot product). In yet another suitable arrangement, dot product circuitry of the type shown in FIG. 6 that is configured to support a 7-element dot product of INT6 operands should have three groups (6 divided by 2) of seven partial products in each group (i.e., 7 multiplies for a 7-element dot product).

Another improvement that can be made is for the addition of the one's to two's complement LSBs. Rather than distributing the LSB "1"s on a partial product by partial product basis as shown in the example of FIG. 5, it is more efficient to first aggregate these LSBs and to subsequently add the aggregated value as a single vector to the rest of the compressed partial product values. In FIG. 5, there are three partial products in each rank group, so there are up to three "1"s that need to be added to the final result.

Figure 7A:
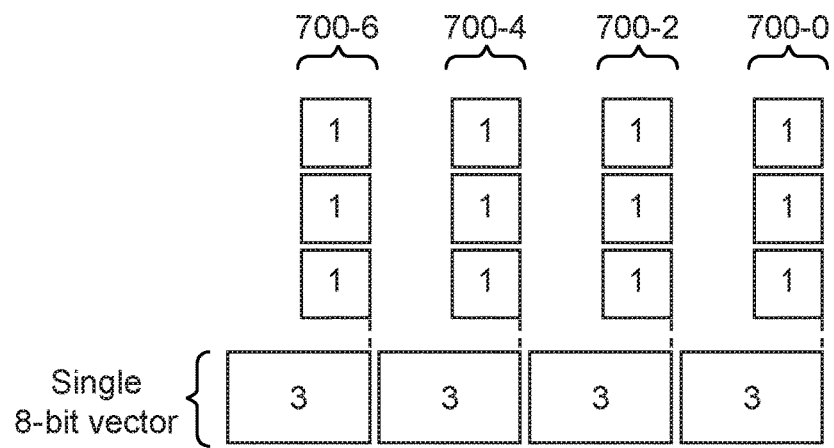
FIG. 7A is a diagram illustrating how the additional one for the one's to two's complement conversion for each partial product may first be aggregated as a single vector prior to compression in accordance with an embodiment.

FIG. 7A is a diagram illustrating how the additional "1"s for of the partial products shown in the example of FIG. 6 may first be aggregated as a single vector prior to compression. The first column 700-0 of "1"s represents the possible one's to two's complement conversion LSBs associated with the rank 0 partial products. The second column 700-2 of "1"s represents the possible one's to two's complement conversion LSBs associated with the rank 2 partial products. The third column 700-4 of "1"s represents the possible one's to two's complement conversion LSBs associated with the rank 4 partial products. The fourth column 700-6 of "1"s represents the possible one's to two's complement conversion LSBs associated with the rank 6 partial products. The columns are shifted/offset based on their respective ranks. The maximum value of three "1"s is 3, which can be encoded in 2 bits, so a very lightweight logic function can convert each column of ones to a corresponding 2-bit value.

Figure 7B:
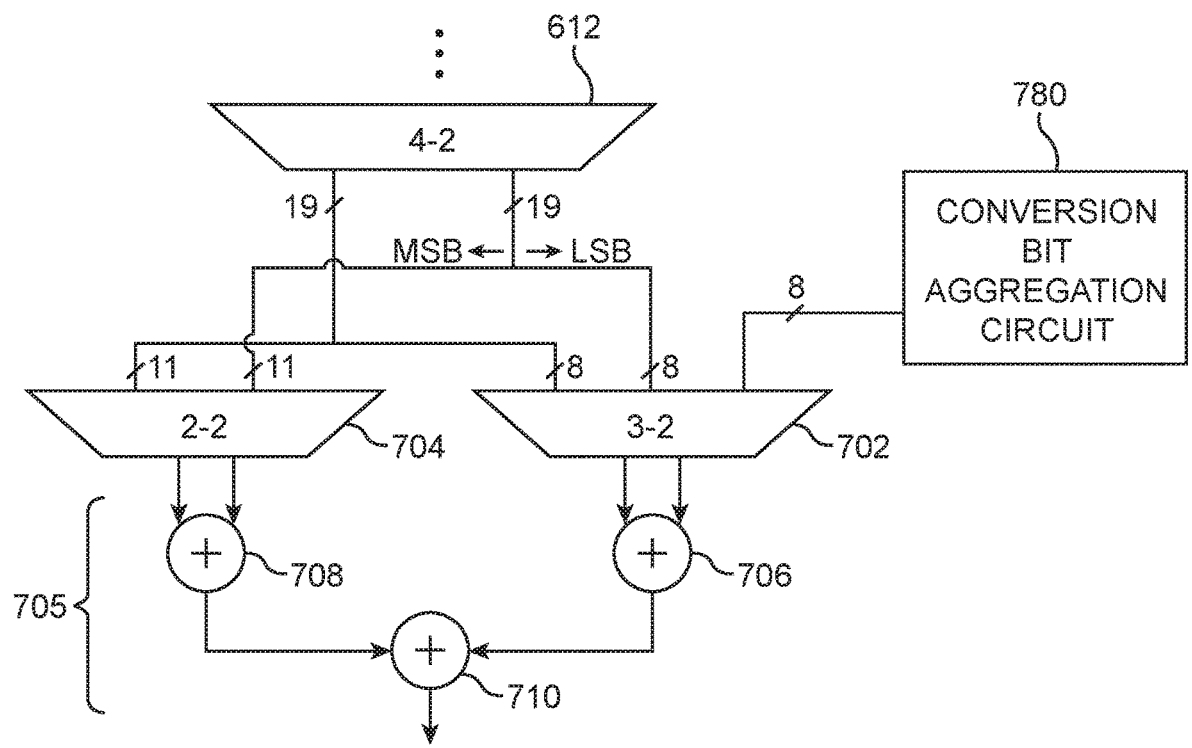
FIG. 7B is a diagram illustrating how the aggregated vector may be injected into the compressor tree in accordance with an embodiment.

Thus, the total value of all the "1"s can be adequately aggregated or appended into a single 8-bit vector using a bit aggregation circuit such as one's to two's conversion LSB aggregation circuit 780 (see, e.g., FIG. 7B).

Depending on the structure and balance of the compressor tree (e.g., a compressor tree of the type shown in FIG. 6), this aggregated ones vector may be inserted somewhere in the middle of the compressor structure, anywhere before the final adder, or just before the final adder. FIG. 7B is a diagram illustrating how the aggregated vector may be injected using an additional 3-2 compressor just before the final CPA 614. As shown in FIG. 8, the aggregated ones vector may be combined with corresponding 8-bit LSB vectors generated at the output of 4-2 compressor 612 (see, e.g., FIG. 6) using 3-2 compressor 702. The remaining 11-bit MSB vectors generated from 4-2 compressor 612 may be separately combined using 2-2 compressor 704. The outputs of 3-2 compressor and the outputs of 2-2 compressor 2-2 may be summed together using a final adder tree 705, which may include adders 706, 708, and 710. If desired, any portion of adder tree 705 may be implemented as a carry propagate adder or other suitable types of addition circuitry.

The example of FIG. 7A, which shows a 3-element dot product of INT8 numbers is merely illustrative. In general, the circuitry, methods, and techniques described herein may be applied to dot product circuitry with any number of multiplies, where the input operands can have any bit width (e.g., 2-bit integers, 4-bit integers, 8-bit integers, 16-bit integers, 32-bit integers, 2 to 64 bit integers, etc.).

Figure 8A:
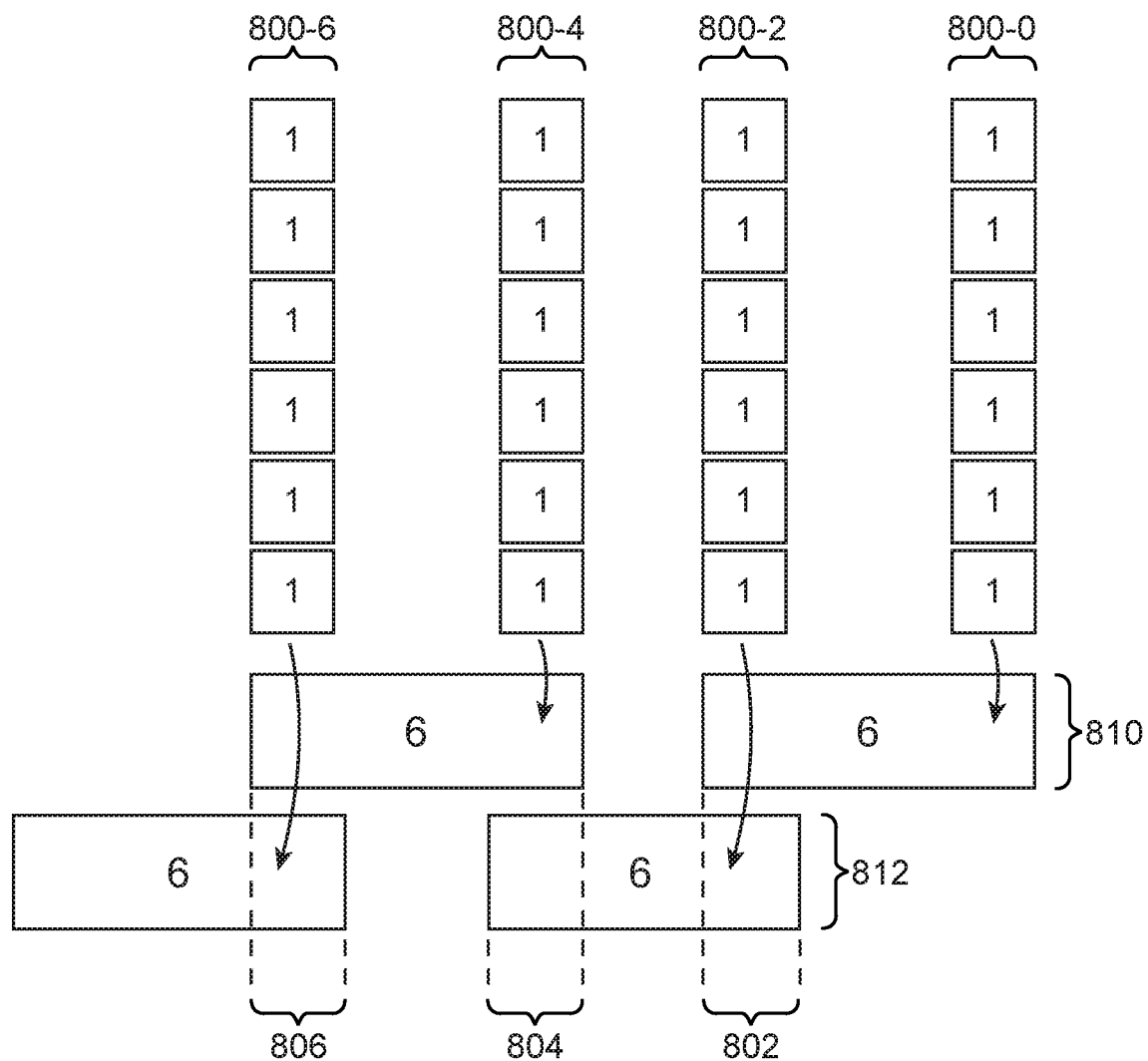
FIG. 8A is a diagram illustrating the aggregation of the additional ones when there are six partial products in accordance with an embodiment.

FIG. 8A illustrates another example showing the one's to two's complement conversion ones associated with a 6-element dot product (i.e., a dot product with six multiplies) of INT8 numbers. Since the input bit-width is 8, there will still be four partial product groups (assuming radix-4 Booth coding). However, each group will now have six partial products since there are six multiply operations.

In this example, the first column 800-0 of LSBs represents the possible one's to two's complement conversion bits associated with the rank 0 partial products. The second column 800-2 of LSBs represents the possible one's to two's complement conversion bits associated with the rank 2 partial products. The third column 800-4 of LSBs represents the possible one's to two's complement conversion bits associated with the rank 4 partial products. The fourth column 800-6 of LSBs represents the possible one's to two's complement conversion bits associated with the rank 6 partial products. The various columns are still shifted/offset by 2-bit steps based on their respective ranks.

Since there are now six total partial products, the unary to binary coding of the "1"s can now result in a value of up to 6, which now requires 3 bits. As a result, alternate column values will now potentially overlap (see, e.g., 1-bit overlapping portion 802 between the aggregated values of columns 800-0 and 800-2, 1-bit overlapping portion 804 between the aggregated values of columns 800-2 and 800-4, and 1-bit overlapping portion 806 between the aggregated values of columns 800-4 and 800-6. Due to this overlap, the sums of the four different rank groups cannot be simply appended together like shown in FIG. 7A.

Figure 8B:
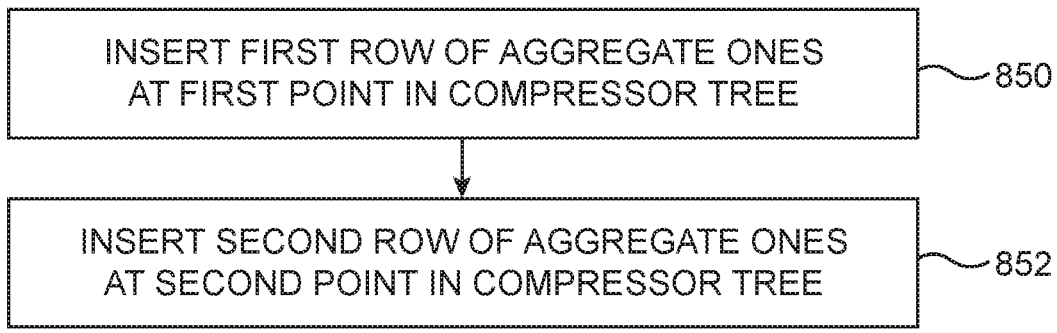
FIG. 8B is a flow chart of illustrative steps for inserting multiple aggregated vectors at different points in the compressor tree in accordance with an embodiment.

One way of dealing with this overlap is to inject the two row values at two different points in the compressor tree (see, e.g., FIG. 8B). As shown in FIG. 8B, the first row of aggregate ones (see row 810 in FIG. 8A) may be inserted in the form of a first vector at a first point in the compressor tree at step 850. At step 852, the second row of aggregate ones (see row 812 in FIG. 8A) may be introduced in the form of a second vector at a second point in the compressor tree that is different than the first point.

Figure 8C:
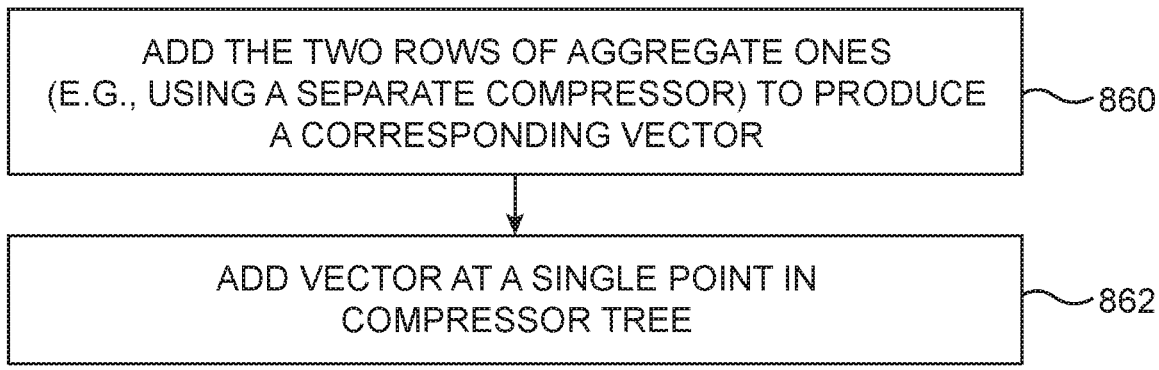
FIG. 8C is a flow chart of illustrative steps for inserting a combined aggregated vector at a single point in the compressor tree in accordance with an embodiment.

Another way of handling this overlap is to combine the two rows together and then add the combined value at a single point in the compressor tree (see, e.g., FIG. 8C). As shown in FIG. 8C, the first row 810 and the second row 812 of aggregate ones may be added together using a separate compressor (as an example) to produce a corresponding compressed ones vector at step 860. At step 862, the compressed ones vector may then be inserted at a single point into the overall compressor tree. The steps of FIGS. 8B and 8C may be performed at conversion bit aggregation circuit (see FIG. 7B).

Figure 9:
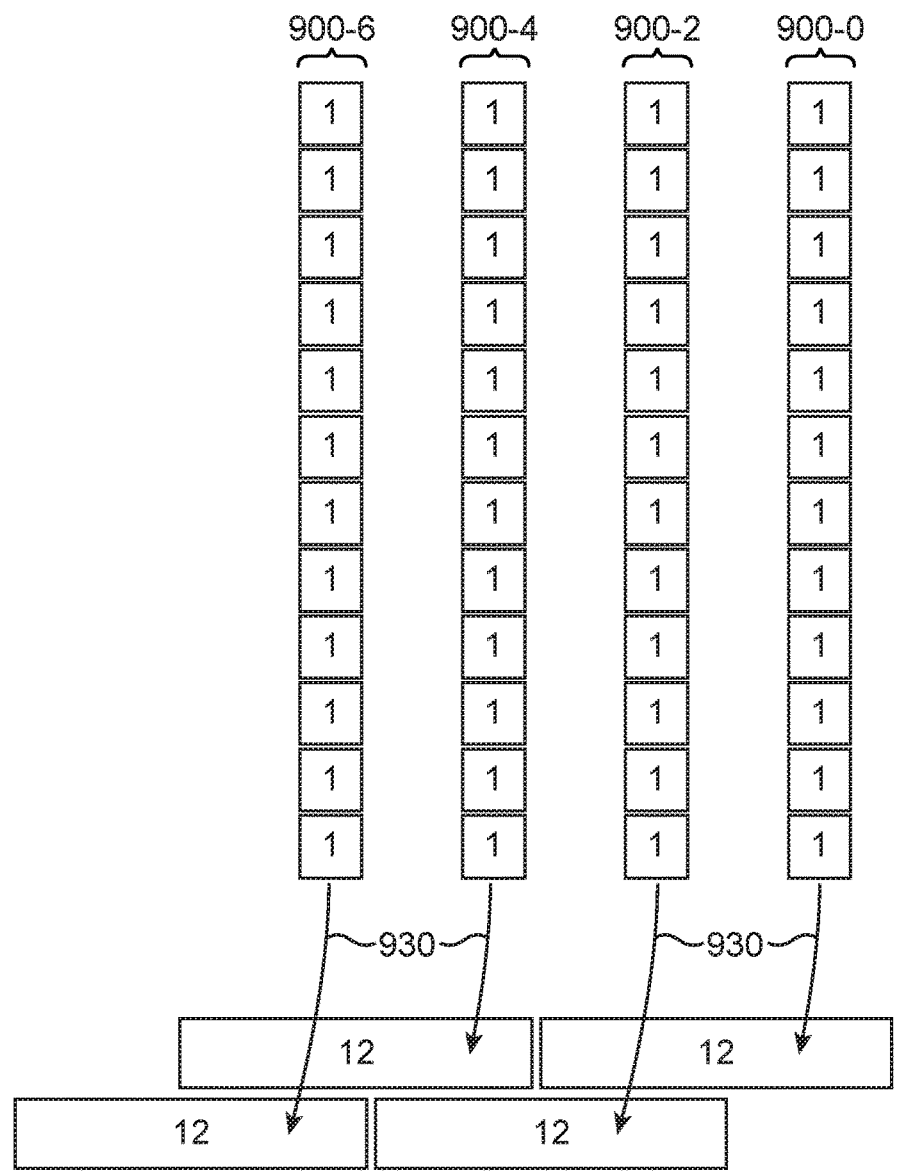
FIG. 9 is a diagram illustrating the aggregation of the additional ones when there are 12 partial products in accordance with an embodiment.

FIG. 9 illustrates the ones aggregation that can be performed by the conversion bit aggregator when the column height is equal to 12 (e.g., for a 12-element dot product with 12 multiplies, which is not an uncommon scenario in an artificial intelligence system). Assuming the inputs are still INT8, the dot product circuitry will still be divided into four groups according to their ranks, but each group will now have 12 partial products of the same rank. As shown in FIG. 9, the first column 900-0 of 12 ones represents the possible one's to two's complement conversion bits associated with the rank 0 partial products. The second column 900-2 of 12 ones represents the possible one's to two's complement conversion bits associated with the rank 2 partial products. The third column 900-4 of 12 ones represents the possible one's to two's complement conversion bits associated with the rank 4 partial products. The fourth column 900-6 of 12 ones represents the possible one's to two's complement conversion bits associated with the rank 6 partial products. The various columns are still shifted/offset by 2-bit steps based on their respective ranks.

Since there are now 12 total partial products in each group, the unary to binary coding of the "1"s can now result in a value of up to 12, which now requires 4 bits. Encoding all the ones using only two rows of 4-bit chunks (as shown by arrows 930) may be very expensive. To save on cost, it is much more efficient to divide the 12-high columns into two 6-bit half columns and then compress the binary halves together or using some combination of addition and/or compression (e.g., carry-propagate addition, carry-save addition, or other suitable addition operation). As shown in portion 940, the four 12-high columns can be divided into eight 6-high half columns (each having a max value of up to 6), resulting in eight 3-bit values. To combine these eight values, the values of the same rank may first be added together. Thereafter, the conversion described above in connection with FIGS. 8A and 8B can be used to add together the overlapping 3-bit chunks and the aggregate value(s) can be inserted appropriately into one or more locations in the compressor tree.

Referring back to the example of FIG. 6, dot product circuitry 600 is configured to perform three multiplies on INT8 inputs. In accordance with another embodiment, this dot product circuitry may also be dynamically reconfigured to perform six multiplies on INT4 inputs. With INT4 inputs, each multiply will only have two partial products (i.e., 4 divided by 2, assuming radix-4 Booth coding). Each multiplier will have a 4-bit multiplicand operand and a 4-bit multiplier operand. The 4-bit multiplicand may be sign extended to 8-bits. The 4-bit multiplier will be divided into two 2-bit segments, which are then used to produce two corresponding partial products offset by 2-bit with respect to one each other.

Figure 10:
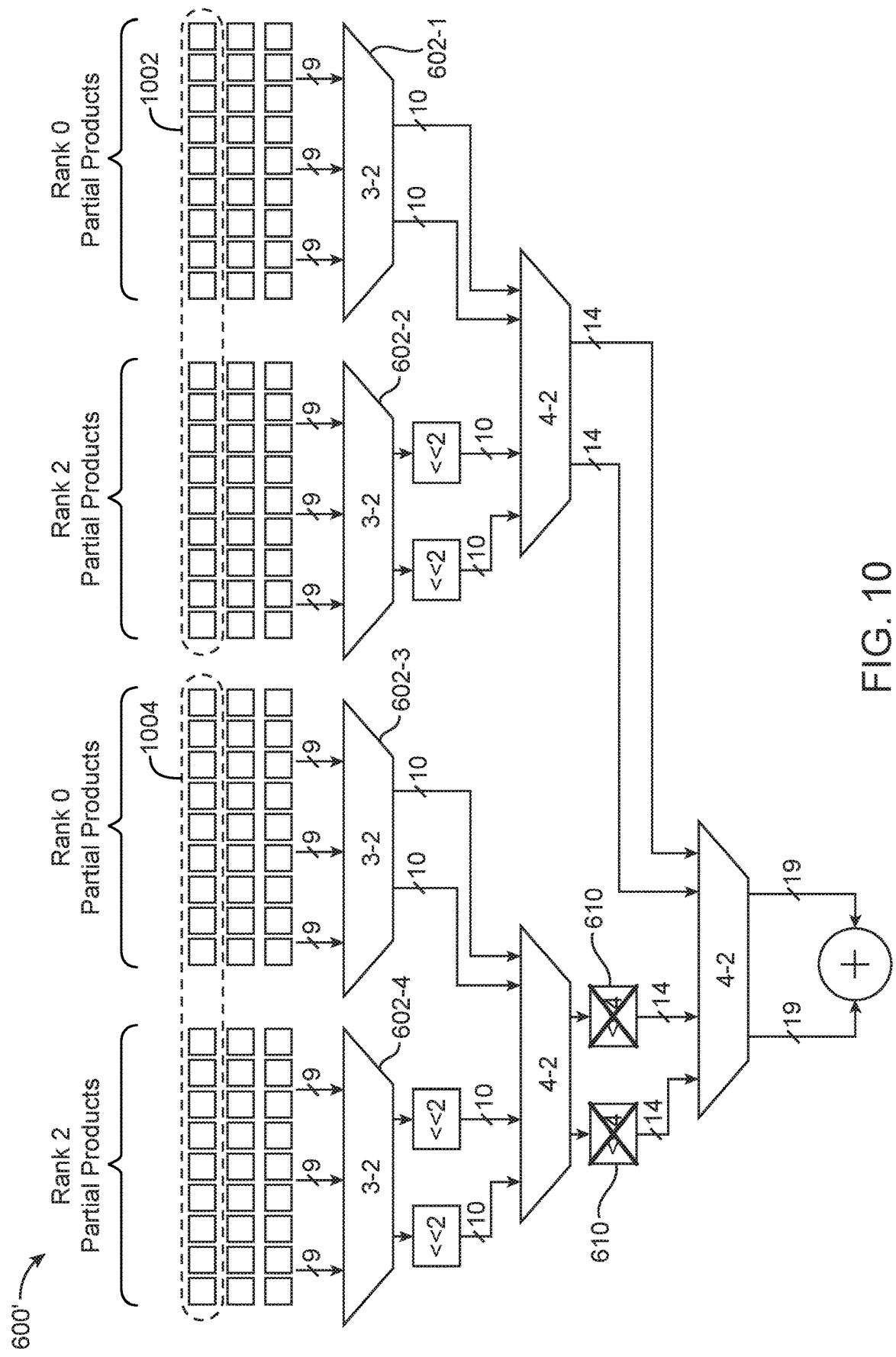
FIG. 10 is a diagram of illustrative rank-based dot product circuitry dynamically reconfigured to support a different input precision in accordance with an embodiment.

FIG. 10 is a diagram of dot product circuitry 600' that has been dynamically reconfigured to support INT4 operations.

As shown in FIG. 10, the two different ranked partial products delineated within region 1002 belong to a first multiplier, whereas the two different ranked partial products delineated within region 1004 belong to a second multiplier. Thus, without changing any of the compressor structure, six pairs of partial products can be supported. The rank 2 partial products are still left shifted by 2 bits relative to the rank 0 partial products. In contrast, however, the upper two groups should not be shifted relative to the lower two groups since the group pairs have the same ranks. In other words, the <<4 shifting circuits 610 may be bypassed or switched out of use using a multiplexer or some other switching circuitry, as indicated by the "X" marked through those circuits. This process effectively stacks the upper two groups directly on top of the bottom two groups, which yields two groups of 6-high columns.

Consider another example where a dot product circuit of the type shown in FIG. 6 is configured to support a 10 multiplier vector of INT8. In such configuration, the dot product circuit will still have 4 groups of 10 high columns. This dot product circuitry can easily be adjusted to support INT4 by selectively bypassing the <<4 shift circuits 610. Bypassing the shifting prior to the final compressor will again stack the upper two groups on top of the lower two groups, effectively resulting in two bigger groups of 20-high columns (i.e., a 20 multiplier vector of INT4). Thus, simply bypassing the <<4 shifting prior to the final compressor allows the dot product circuitry to support a different input precision while doubling the total multiplier count.

The one's to two's conversion bit columns are handled slightly differently. The unary to binary combinatorial conversions will be bounded at the larger multipliers with shallower columns, so when the bits are aligned for the smaller multipliers with deeper columns, the binary values just stack on top of each other. There may be two different compression/addition circuits for the two multiplier precisions, with a multiplexer that can select between the two for the actual conversion vector used.

Figure 11:
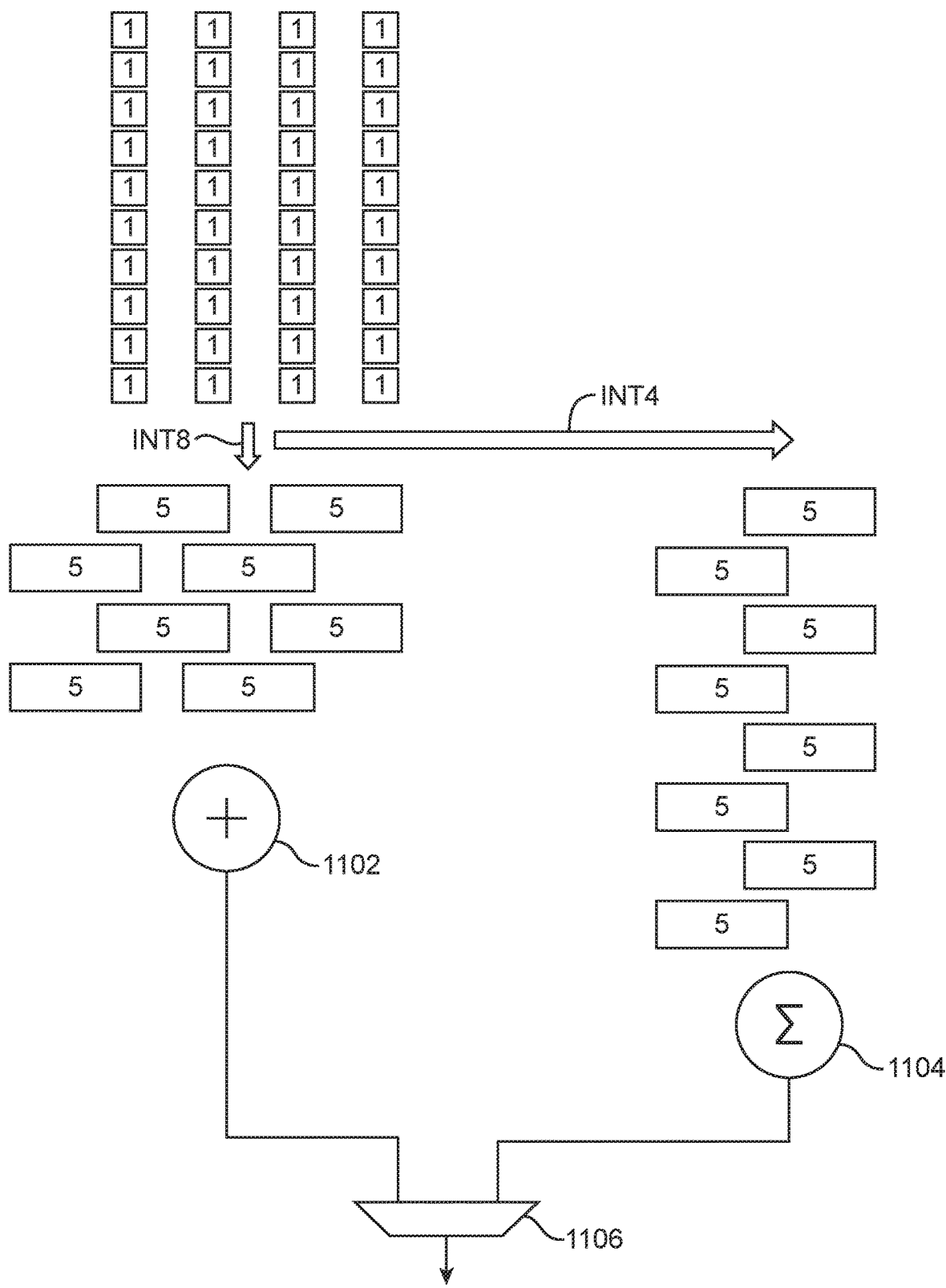
FIG. 11 is a diagram showing two separate circuits for aggregating conversion bits for different precision modes in accordance with an embodiment.

FIG. 11 illustrates an example with 10 multiplies. Although the total number of bits will be the same, there will be four columns of 10-high "1"s for the INT8 case but only two columns of 20-high "1"s for the INT4 case. In the example of FIG. 11, the unary to binary conversion will split the 10-high columns into two 5-bit halves. In the INT8 case, the column binary counts having a max value of 5 (e.g., a 3-bit value) are offset by 2 bits with respect to each other. These values may be summed using a series of carry propagate adders (CPAs), carry save adders (CSAs), one or more CSAs followed by one or more CPAs one or more CPAs followed by one or more CSAs, and/or using other adder circuitry, as represented by adder circuitry 1102.

In the INT4 case, the 20-high column can still be divided into 5-bit chunks with binary counts having a max value of 5 (e.g., a 3-bit value), which are still offset by 2 bits with respect to each other. The binary counts of the two upper columns will now be aligned directly underneath the two lower columns. Similarly, these values may be summed together using a variety of adder architectures as represented by summation circuitry 1104 to aggregate the total contribution of the conversion bits. As described above, a multiplexing circuit such as multiplexer 1106 may be used to select between the two aggregate values depending on the current precision (e.g., depending on whether the current mode is supporting INT8 or INT4). If desired, the dot product circuitry may also be dynamically configured to support INT2 operation, INT16 operation, INT32 operation, INT64 operation, etc. by optionally bypassing one or more shifting circuits in the compressor tree and/or by stacking partial products or conversion LSBs among two or more different groups.

Figure 12:
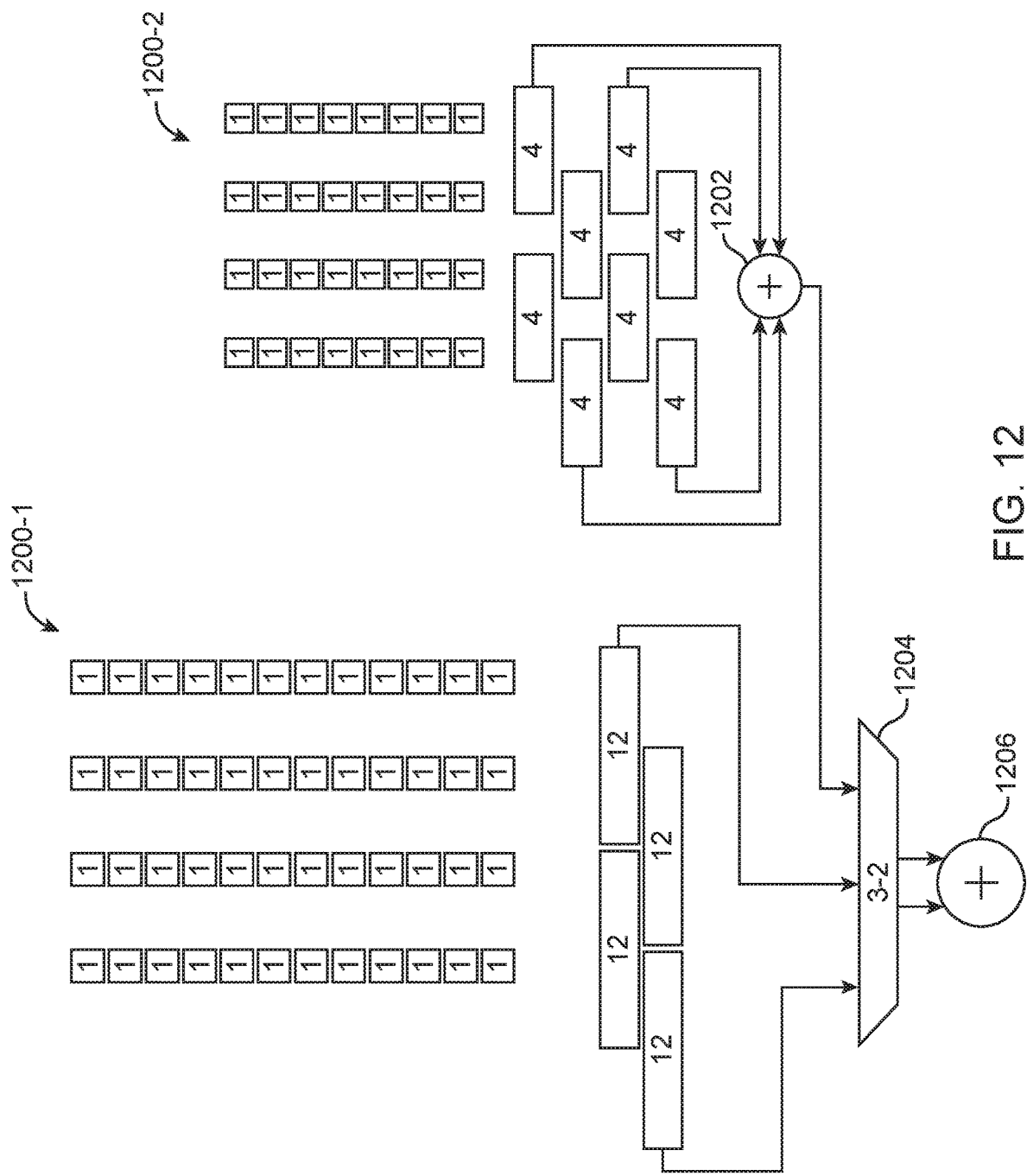
FIG. 12 is a diagram illustrating the decomposition of a larger dot product circuitry in accordance with an embodiment.

In accordance with another suitable arrangement not mutually exclusive with any of the embodiments described in connection with FIGS. 1-11, a large multiplier array may be optionally decomposed into multiple smaller multiplier groups. FIG. 12 illustrates an example of a 20-element dot product operation that is decomposed into a 12-element dot group and an 8-element dot group. Assuming INT8 or INT4 numbers, dot product circuitry of the type described in connection with FIGS. 6 and 10 may be configured to support both decomposed dot groups, each with a different column height. Decomposing the 20-element dot product into two smaller dot products can provide a technical advantage of further reducing word growth for the compressors in the partial product summation structure.

As discussed in connection with at least FIGS. 7, 8, 9, and 11, the aggregation of the conversion LSB bits can be arranged independently of the partial product reduction tree. As shown in FIG. 12, the conversion bits 1200-1 associated with 12-element dot group may be aggregated using the method described in connection with FIG. 9 (e.g., using two levels of 4-bit counts of up to a maximum value of 12 each or by dividing into 6-bit half columns to yield four levels of 3-bit counts of up to a maximum value of 6 each). The maximum aggregate LSB value for the group of 12 columns is 1020 (i.e., 12+12<<2+12<<4+12<<6=1020).

Meanwhile, the conversion bits 1200-2 associated with the 8-element dot group may be aggregated by first dividing the 8-high columns of "1"s into two 4-bit half columns and then combining the binary values together using some combination of addition and/or compression (e.g., carry-propagate addition, carry-save addition, or other suitable addition operation) as represented by adder 1202. The maximum aggregate LSB value for the group of 8 columns is 680 (i.e., 8+8<<2+8<<4+8<<6=680) A final 3-2 compressor 1204 may then compress the aggregate values from the two groups, and the resulting two vectors summed together using a final CPA 1206.

This example of splitting up a 20-element multiply into two groups of different sizes is merely illustrative. As another example, a 10 multiplier vector may be decomposed into 6 and 4 multiplier vectors. In general, a larger multiplier can be decomposed into two or more multiplier vectors of the same or different sizes (e.g., decomposed into three dot groups having multipliers of different sizes, into four dot groups with multipliers of different sizes, into more than four dot groups having multipliers of different sizes, etc.), which will allow the compressor structures to be tuned separately for optimal performance. In the 10-element multiplier mentioned above, the 6 multiplier vector reduction scheme can have two 3-2 compressors in the first level followed by a 4-2 compressor. The 4 multiplier vector reduction scheme can be handled using a 4-2 compressor.

The embodiments described here relating to radix-4 (R4) Booth coding is merely illustrative and is not intended to limit the scope of the present embodiments. If desired, these techniques for improving the partial product reduction/compression and the conversion bit aggregation may be extended to multiplier operations implemented using simple radix-2 multiplies (e.g., by multiplying the multiplicand with one bit of the multiplier at a time, which would double the number of partial products relative to R4), radix-8 Booth coding, radix-16 Booth coding, just to name a few. For radix-8 (R8) Booth coding, the offsets/shifting between the different partial product groups will be three bits instead of two bits. Thus, in the dot product architecture of FIG. 6, shifting circuits 606 and 607 will be 3 bits instead of 2 bits, and the second level of shifting at circuit 610 will be 6 bits instead of just 4 bits. There will also be a different number of partial products, but the grouping of partial products based on rank will still be used.

EXAMPLES

The following examples pertain to further embodiments.

Example 1 is an integrated circuit, comprising: a partial product generation circuit configured to receive input operands and to generate corresponding partial products; a first compressor circuit configured to receive a first group of the partial products all having a first rank and configured to output first vectors; and a second compressor circuit configured to receive a second group of the partial products all having a second rank that is different than the first rank and configured to output second vectors.

Example 2 is the integrated circuit of example 1, wherein the first group of the partial products are optionally not shifted relative to each other.

Example 3 is the integrated circuit of example 2, wherein the second group of the partial products are optionally not shifted relative to each other.

Example 4 is the integrated circuit of any one of examples 1-3, optionally further comprising: first shifting circuits configured to shift the second vectors relative to the first vectors.

Example 5 is the integrated circuit of example 4, optionally further comprising: a third compressor circuit configured to receive a third group of the partial products all having a third rank that is different than the first and second ranks and configured to output third vectors; and a fourth compressor circuit configured to receive a fourth group of the partial products all having a fourth rank that is different than the first, second, and third ranks and configured to output fourth vectors.

Example 6 is the integrated circuit of example 5, optionally further comprising: second shifting circuits configured to shift the fourth vectors relative to the third vectors.

Example 7 is the integrated circuit of example 6, optionally further comprising: a fifth compressor configured to compress the first vectors and the second shifted vectors and configured to output fifth vectors; and a sixth compressor configured to compress the third vectors and the fourth shifted vectors and configured to output sixth vectors.

Example 8 is the integrated circuit of example 7, optionally further comprising: third shifting circuits configured to shift the sixth vectors relative to the fifth vectors.

Example 9 is the integrated circuit of example 8, wherein the third shifting circuits are optionally selectively bypassable to support a plurality of input precisions.

Example 10 is the integrated circuit of example 9, optionally further comprising: a seventh compressor configured to compress the fifth vectors and the sixth vectors to output corresponding seventh vectors; and a carry-propagate adder configured to receive the seventh vectors and to output a corresponding dot product value.

Example 11 is the integrated circuit of any one of examples 1-10, optionally further comprising: an aggregation circuit configured to aggregate one's to two's complement conversion bits associated with the partial products.

Example 12 is the integrated circuit of example 11, wherein the aggregation circuit is optionally further configured to aggregate the conversion bits into a single vector.

Example 13 is the integrated circuit of example 11, wherein the one's to two's complement conversion bit aggregation circuit is optionally further configured to aggregate the conversion bits into at least two different vectors.

Example 14 is an integrated circuit, comprising: partial product generation circuitry configured to receive input signals and to generate a plurality of partial products; and a compressor tree divided into a plurality of compressor groups organized based on the rank of the partial products received at each of the plurality of compressor groups, and wherein the partial products in each of the plurality of compressor groups have identical ranks.

Example 15 is the integrated circuit of example 14, optionally further comprising: a one's to two's complement conversion bit aggregation circuit configured to generate at least one vector that is injected at a single point in the compressor tree.

Example 16 is the integrated circuit of example 14, optionally further comprising: a one's to two's complement conversion bit aggregation circuit configured to generate at least two vectors that are injected at two different points in the compressor tree.

Example 17 is the integrated circuit of example 14, wherein the compressor tree optionally comprises a set of shifting circuits that is switched into use when operating the compressor tree to support a first precision mode and that is switched out of use when operating the compressor tree to support a second precision mode different than the first precision mode.

Example 18 is the integrated circuit of example 17, optionally further comprising: a first one's to two's complement conversion bit aggregation circuit; a second one's to two's complement conversion bit aggregation circuit; and a multiplexer configured to select only the first one's to two's complement conversion bit aggregation circuit during the first precision mode and to select only the second one's to two's complement conversion bit aggregation circuit during the second precision mode.

Example 19 is an integrated circuit, comprising: dot product circuitry that is decomposed into a first dot group and a second dot group to reduce compressor word growth in the dot product circuitry, wherein the first dot group has a first number of multiplies, and wherein the second dot group has a second number of multiplies that is different than the first number of multiplies.

Example 20 is the integrated circuit of example 19, optionally further comprising: a first aggregation circuit configured to aggregate conversion bits associated with the first dot group; a second aggregation circuit configured to aggregate conversion bits associated with the second dot group; and a compressor configured to compress values received from the first and second aggregation circuit.

Example 21 is the integrated circuit of any one of examples 19-20, wherein the dot product circuitry is optionally further decomposed into a third dot group having a third number of multiplies that is different than the first and second numbers of multiplies.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:
1. An integrated circuit, comprising:
a partial product generation circuit configured to;

receive input operands and generate partial products grouped into a first group of the partial products all having a first rank and a second group of the partial products all having a second rank that is different than the first rank, wherein the second rank is shifted relative to the first rank;

a first compressor circuit configured to compress the first group of the partial products into first vectors; and a second compressor circuit configured to compress the second group of the partial products into second vectors;

first shifting circuits configured to shift the second vectors relative to the first vectors and output second shifted vectors;

a third compressor circuit configured to receive a third group of partial products all having a third rank that is different from the first rank or the second rank and configured to output third vectors;

a fourth compressor circuit configured to receive a fourth group of partial products all having a fourth rank that is different from the first rank, the second rank, or the third rank and configured to output fourth vectors;

second shifting circuits configured to shift the fourth vectors relative to the third vectors to generate fourth shifted vectors;

a fifth compressor circuit configured to compress the first vectors and the second shifted vectors and configured to output fifth vectors;

a sixth compressor circuit configured to compress the third vectors and the fourth shifted vectors and configured to output sixth vectors;

third shifting circuits configured to shift the sixth vectors relative to the fifth vectors; and a multiplexer configured to selectively bypass the third shifting circuits to support a plurality of input precisions based on a multiplexer.

2. The integrated circuit of claim 1, wherein the first group of the partial products are not shifted relative to each other.

3. The integrated circuit of claim 2, wherein the second group of the partial products are not shifted relative to each other.

4. The integrated circuit of claim 1, further comprising:
a seventh compressor circuit configured to compress the fifth vectors and the sixth vectors to output seventh vectors; and
a carry-propagate adder configured to receive the seventh vectors and to output a corresponding dot product value.

5. The integrated circuit of claim 1, further comprising:
an aggregation circuit configured to aggregate one's to two's complement conversion bits associated with the partial products.

6. The integrated circuit of claim 5, wherein the aggregation circuit is further configured to aggregate the conversion bits into a single vector.

7. The integrated circuit of claim 5, wherein the aggregation circuit is configurable to aggregate the conversion bits into at least two different vectors.

8. The integrated circuit of claim 5, further comprising:
an additional aggregation circuit configured to aggregate the one's to two's complement conversion bits associated with the partial products.

9. The integrated circuit of claim 8, further comprising:
an additional multiplexer configurable to select only the aggregation circuit during a first precision mode and to select only the additional aggregation circuit during a second precision mode.

10. The integrated circuit of claim 8, wherein the aggregation circuit is configured to generate at least one vector that is injected at the first compressor circuit, the second compressor circuit, the third compressor circuit, the fourth compressor circuit, the fifth compressor circuit, or the sixth compressor circuit.

11. An integrated circuit, comprising:
partial product generation circuitry configured to receive input signals and to generate a plurality of partial products grouped into a first group of the partial products all having a first rank and a second group of the partial products all having a second rank that is different than the first rank, wherein the second rank is shifted relative to the first rank; and
a compressor tree divided into a plurality of compressor groups organized based on a rank of respective groups of the plurality of partial products received at respective compressor groups of the plurality of compressor groups, wherein the respective compressor groups are configurable to:
compress the first group of the partial products into first vectors; and
compress the second group of the partial products into second vectors; and
a multiplexer configurable to select only a first one's to two's complement conversion bit aggregation circuit during a first precision mode and select only a second one's to two's complement conversion bit aggregation circuit during a second precision mode.

12. The integrated circuit of claim 11, further comprising:
the first one's to two's complement conversion bit aggregation circuit configured to generate at least one vector that is injected at a single point in the compressor tree.

13. The integrated circuit of claim 11, further comprising:
the first one's to two's complement conversion bit aggregation circuit configured to generate at least two vectors that are injected at two different points in the compressor tree.

14. The integrated circuit of claim 11, wherein the compressor tree comprises a set of shifting circuits that is switched into use when operating the compressor tree to support the first precision mode and that is switched out of use when operating the compressor tree to support the second precision mode different than the first precision mode.

15. An integrated circuit, comprising:
dot product circuitry decomposed into:
a first dot group comprising a first number of multiplies having a first rank;
a second dot group comprising a second number of multiplies having a second rank that is shifted relative to the first rank by a number of conversion bits;
a first aggregation circuit configured to aggregate first conversion bits associated with the first dot group;
a second aggregation circuit configured to aggregate second conversion bits associated with the second dot group;
a compressor configured to compress the first conversion bits received from the first aggregation circuit and the second conversion bits received from the second aggregation circuit;
a plurality of one's to two's complement conversion bit aggregation circuit configured to generate at least one vector that is injected at a single point in the compressor; and a multiplexer configured to select only a first one's to two's complement conversion bit aggregation circuit of the plurality of one's to two's complement conversion bit aggregation circuit during a first precision mode and to select only a second one's to two's complement conversion bit aggregation circuit of the plurality of one's to two's complement conversion bit aggregation circuit during a second precision mode.

16. The integrated circuit of claim 15, wherein the first conversion bits and the second conversion bits are not shifted prior to being received by the compressor.

17. The integrated circuit of claim 15, further comprising a carry-propagate adder configured to receive at least the first dot group and the second dot group and output a corresponding dot product value.

18. The integrated circuit of claim 15, wherein the first number of multiplies are not shifted relative to each other, and wherein the second number of multiplies are not shifted related to each other.

19. The integrated circuit of claim 11, wherein the first group of the partial products are not shifted relative to each other, and wherein the second group of partial products are not shifted relative to each other.

20. The integrated circuit of claim 11, further comprising a carry-propagate adder configured to receive at least the first vectors and the second vectors and output a corresponding dot product value.

* * * * *